Oct. 26, 1965 L. TROY Re. 25,888

INTERNALLY EXPANDING VEHICLE BRAKE SHOE
CONSTRUCTION WITH EXTERIOR ACTUATORS

Original Filed Sept. 5, 1961 3 Sheets-Sheet 1

INVENTOR
Leonard Troy

BY Samuel Mendowitz
ATTORNEY

INVENTOR
Leonard Troy

BY Samuel Mecklenberg
ATTORNEY

INVENTOR
Leonard Troy

BY Samuel Mendrecks
ATTORNEY

United States Patent Office

Re. 25,888
Reissued Oct. 26, 1965

25,888

INTERNALLY EXPANDING VEHICLE BRAKE SHOE CONSTRUCTION WITH EXTERIOR ACTUATORS

Leonard Troy, 611 N. Webster Ave., Scranton, Pa.

Original No. 3,135,362, dated June 2, 1964, Ser. No. 136,423, Sept. 5, 1961. Application for reissue Apr. 15, 1965, Ser. No. 458,502

14 Claims. (Cl. 188—78)

Matter enclosed in heavy brackets [ ] appears in the original patent but forms no part of this reissue specification; matter printed in italics indicates the additions made by reissue.

This invention relates in general to new and useful improvements in brake constructions, and more particularly to a novel vehicle brake construction.

A primary object of this invention is to provide a novel brake construction for vehicles wherein each brake shoe is provided with a separate actuator even though a given wheel brake assembly may incorporate two or more such brake shoes.

Another object of this invention is to provide a novel vehicle wheel brake construction wherein the actuator for the brake shoe thereof is disposed exteriorly of the brake drum in a position where the actuator is not affected by the usual heat generated within the drum, and suitable linkage is provided for transmitting the force of an actuator to a brake shoe to effect the pivoting of a brake shoe into engagement with a vehicle brake drum, the linkage being of a nature wherein the force applied to the brake shoe to effect the movement thereof is substantially in the direction of movement.

Another object of this invention is to provide novel means for actuating a vehicle brake shoe by an actuator disposed externally of the immediate environment of the brake shoe, the brake construction including a bellcrank which is disposed generally within the plane of the brake shoe and which is pivotally mounted for movement in a plane disposed generally normal to the plane of the brake shoe wherein a lateral force from an actuator may be transmitted through the bellcrank to the brake shoe with the force being transmitted to the brake shoe substantially in the direction of movement of the brake shoe.

Another object of this invention is to provide a novel brake construction wherein each brake shoe is provided with a separate shoe spider for pivotally mounting the same, each of the shoe spiders being of a construction wherein it may be readily welded or otherwise secured to a wheel support, such as an axle housing.

Still another object of this invention is to provide a novel vehicle wheel construction wherein each brake shoe of the wheel construction is provided with a shoe spider which may be readily welded to an axle housing or the like, and the bellcrank is provided for transferring a laterally directed force from the brake shoe actuator to the brake shoe in the direction of movement of the brake shoe, a bellcrank spider being provided for the individual bellcrank for mounting the bellcrank for movement in a plane generally normal to the plane of the brake shoe, the bellcrank spider also being provided with means for effecting the welding or otherwise securement thereof to the axle housing or like support.

A further object of this invention is to provide a novel vehicle wheel brake construction wherein the actuator for each brake shoe is disposed externally of the general confines of the brake and motion is transmitted from each actuator to its respective brake shoe by means of a bellcrank mounted generally within the confines of the brake shoes, the bellcrank having a separate supporting spider which is suitably secured to a vehicle wheel support, and the bellcrank spiders serving to support a dust shield which is disposed intermediate each bellcrank and its respective actuator.

With the above and other objects in view that will hereinafter appear, the nature of the invention will be more clearly understood by reference to the following detailed description, the appended claims and the several views illustrated in the accompanying drawings:

Figure 4:
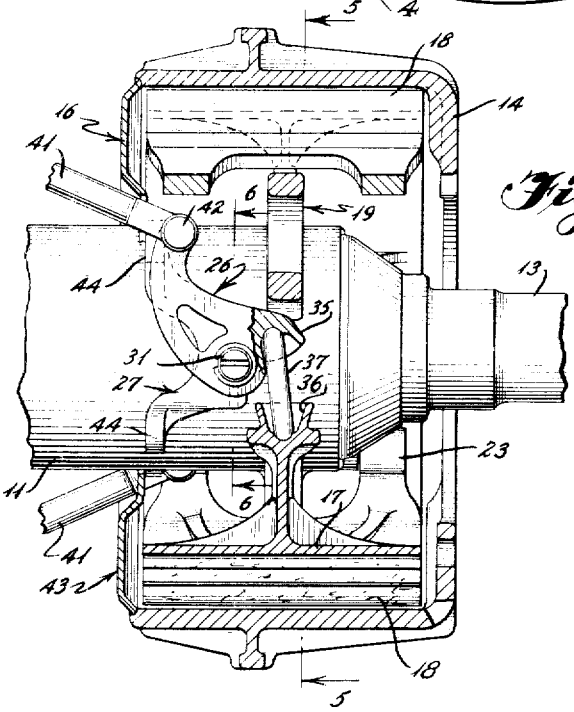
FIGURE 4 is an enlarged sectional view taken along the section line 4—4 of FIGURE 3, and shows the specific details of one of the bellcranks and the manner in which a force is transmitted thereby to a brake shoe.
Figure 8:
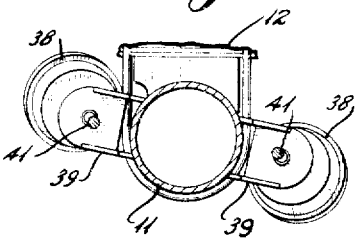
FIGURE 8 is an enlarged fragmentary vertical sectional view taken along the line 8—8 of FIGURE 2, and shows the specific arrangement of the brake shoe actuators.
Figure 5:
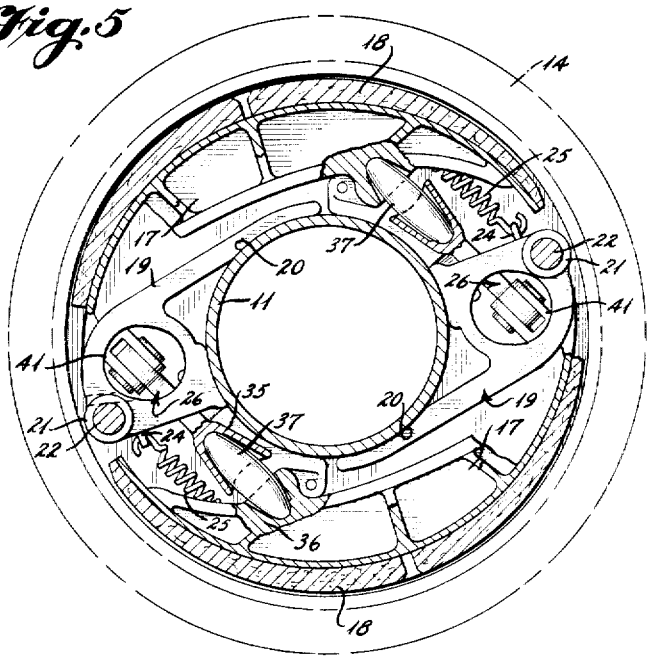
FIGURE 5 is an enlarged vertical sectional view taken along the line 5—5 of FIGURE 4, and shows the specific details of mounting of the brake shoes.

Referring now to the drawings in detail, it will be seen that there is illustrated a vehicle wheel assembly which is generally referred to by the numeral 10. The vehicle wheel assembly 10 includes an axle housing 11 which is connected to a load transmitting spring 12 in the customary manner. As is shown in FIGURE 4, the axle housing 11 terminates at the end thereof in a suitable spindle 13. On the spindle 13 there is rotatably mounted a hub (not shown) to which a brake drum 14 is secured. In a like manner, one or more vehicle wheels 15 is secured to the hub which is not illustrated. It is to be understood that the hub, the spindle 13, the brake drum 14 and the vehicle wheels 15 will be generally of a conventional construction, although they may be of a special design. It is also pointed out that the hub may either be of the freely rotating type or may be driven; in the case the hub is driven, there will be provided an axle which will pass through the axle housing 11, or the hub could be driven by other type of drive means (not shown) including a drive belt.

This invention is particularly directed to a brake construction for the brake drum 14, the brake construction being generally referred to by the numeral 16.

The brake construction 16 is illustrated as including a pair of identical brake shoes 17, each having a lining 18. It is to be understood, however, that in accordance with the invention, there may be one or more brake shoes 17, with the number of brake shoes possibly exceeding two.

Figure 3:
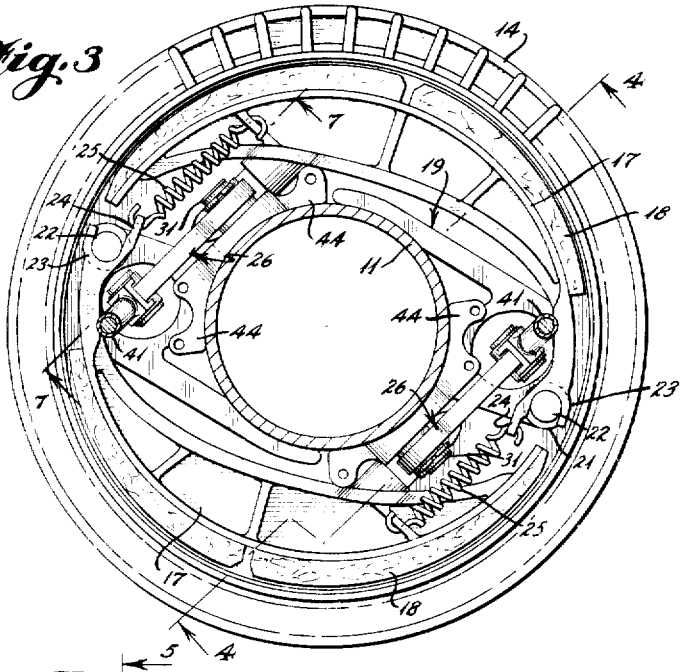
FIGURE 3 is an enlarged fragmentary vertical sectional view taken along the line 3—3 of FIGURE 2, and shows the internal construction of the vehicle wheel brake.

Each of the brake shoes 17 is supported by a brake shoe spider 19 which is suitably secured to the axle housing 11, as at 20, by welding or the like. Each of the brake shoe spiders is generally of a T configuration in elevation and includes a tubular portion 21 which extends parallel to the axis of the axle housing 11. An elongated pivot pin 22 passes through each tubular portion 21 and the ends thereof are received in U-shaped end portions 23 of a respective brake shoe 17, as is best shown in FIGURE 3. In lieu of the U-shaped ends, the brake shoes may be provided with transverse bores for reception of the pins 22.

It is to be noted that a trailing end of one of the brake shoes 17 is disposed adjacent the pivoted end of the next brake shoe. The pivoted end of each brake shoe is provided with a hook portion 24 on the generally U-shaped portion 23 and receives one end of a return spring 25. The opposite end of the return spring 25 is suitably connected to a portion of the trailing end of the respective brake shoe.

Figure 6:
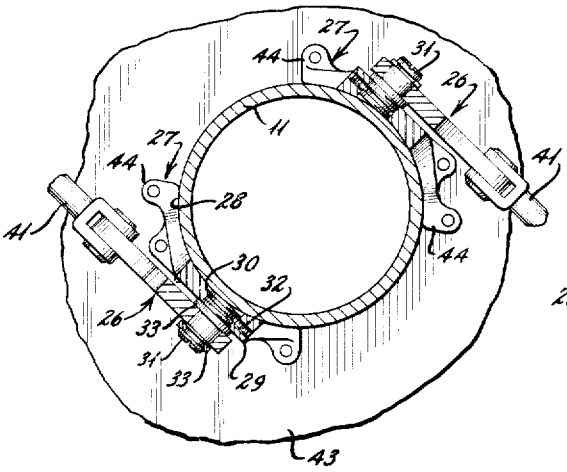
FIGURE 6 is an enlarged fragmentary vertical sectional view taken along the line 6—6 of FIGURE 4, and shows the specific details of the spiders supporting the bellcranks and the relationship thereof with respect to the bellcranks.
Figure 7:
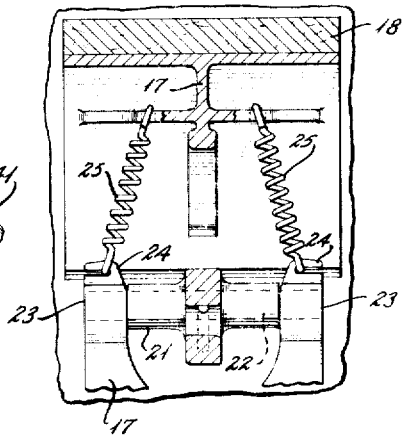
FIGURE 7 is an enlarged fragmentary vertical sectional view taken along the line 7—7 of FIGURE 3, and shows the arrangement of return springs of the brake shoes.

For each of the brake shoes 17 there is a bellcrank, generally referred to by the numeral 26, and best illustrated in FIGURE 4. Each bellcrank 26 is carried by a bellcrank spider 27. As is best shown in FIGURE 6, each bellcrank spider 27 is separately secured to the axle housing 11, as at 28, by welding, for example. Each of the bellcrank spiders 27 is generally of an L-shape and includes an offset flange 29 which has a threaded bore 30 receiving a pivot pin 31 for the associated bellcrank 26. The pivot pin 31 is locked in an adjusted position with respect to its respective bellcrank spider 27 by means of a set screw 32. Suitable washers 33 and 34 are carried by the bellcrank pivot pin 31 on opposite sides of the bellcrank 26. It is to be noted that the individual bellcrank 26 is mounted for swinging movement in a plane disposed generally normal to the plane of the brake shoes 17.

Each bellcrank 26 is provided with an enlarged socket 35 which generally faces a similar socket 36 on a respective one of the brake shoes 17. A push rod 37 is freely mounted in the sockets 35 and 36 for transferring a force from the bellcrank 26 to its respective brake shoe 17.

Figure 1:
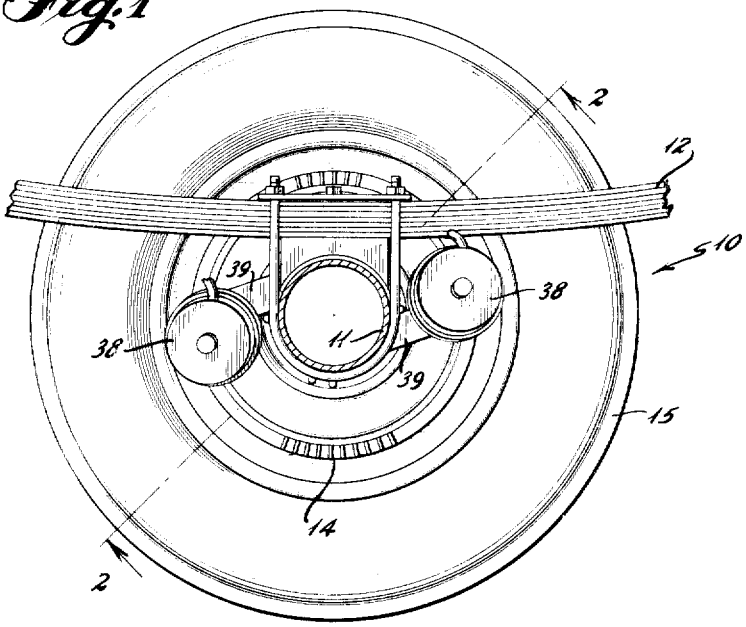
FIGURE 1 is an elevational view of a vehicle wheel from the inside and shows the general details of the brake assembly thereof, the vehicle axle housing being shown in section and only a central portion of a supporting spring being illustrated.
Figure 2:
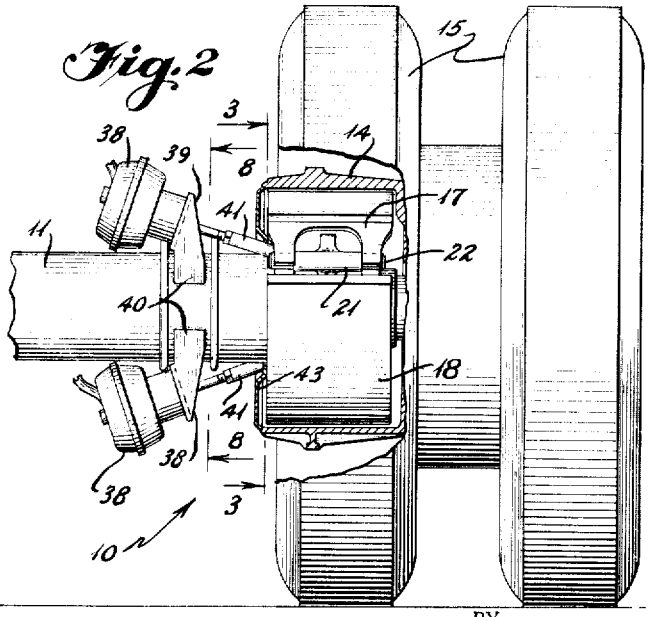
FIGURE 2 is a rear elevational view of the wheel assembly of FIGURE 1, with a portion of one of the wheels being broken away and shown in section, with the section being taken substantially along the line 2—2 of FIGURE 1.

There is provided a separate actuator 38 for each of the brake shoes 17. Each actuator 38 is secured to the axle housing 11 by means of a bracket 39 which is directly welded to the axle housing 11, as at 40. Each of the actuators 38 is provided with a linearly movable link 41 which is pivotally connected to the associated bellcrank 26 by means of a pivot pin 42. It will be readily apparent that when the link 41 is moved to the right, as is shown in FIGURES 2 and 4, the bellcrank 26 associated therewith will be pivoted and the push rod 37 will act on the respective brake shoe 17 to overcome the tension of the return springs 25 thereof and force the lining 18 of the respective brake shoe 17 into engagemnet with the brake drum 14.

Although the actuators 38 illustrated in the drawings are of the pneumatic type, it is to be understood that the actuators 38 may be of any desired type, including hydraulic, electric, etc.

As is best shown in FIGURE 4, each of the bellcrank spiders 27 is provided with a pair of mounting flanges 42 which are disposed in a plane normal to the axis of the axle housing 11. A dust shield 43 is secured to the mounting flanges 42 of the several bellcrank spiders 27 and cooperate with the brake drum 14 to prevent foreign matter from entering into the general confines of the brake drum 14 for interference with the brake construction 16. It is to be understood that the dust shield 43 will be provided with suitable openings for the passage of the links 41.

At this time, it is pointed out that the links 41 are sectional so that the lengths thereof may be adjusted. In this manner, the individual brake shoes 17 are adjusted relative to the brake drum 14.

It is believed that by carefully studying the brake construction 16, the advantages of the simplicity thereof will become readily apparent. However, attention is directed to the fact that each brake shoe is supported by a simple brake shoe spider which is identical throughout the brake construction and which is readily secured to a vehicle axle housing by welding, thus providing an extremely rigid and strong construction. In like manner, each bellcrank is supported by a bellcrank spider with all the bellcrank spiders being identical and each bellcrank spider being separately secured to an axle housing, such as by welding, for rigidity and strength of construction. In addition, all of the bellcranks are identical and are mounted in protected positions within the confines of the brake drum and the dust shield, with each bellcrank being pivotally mounted in a plane disposed normal to the general plane of the brake shoes so that the brake shoe actuating force delivered by each of the bellcranks may be substantialy in the direction of movement of the associated brake shoes. The advantages of the provision of a separate actuator for each brake shoe are obvious in that each actuator will provide for a braking force independent of any other actuator. It will also be readily apparent that a decided advantage is obtained by placing the actuators exteriorly of the general confines of the brake drum in that when the actuators are so located, they are completely free of the heat which is generated within the brake drum and at the same time are positioned whereby during movement of the vehicle cooling air will flow over the actuators.

Although specific reference has been made to a dust shield, and a dust shield is desired by many operators to keep foreign matter out of the brake assembly, particularly from between the brake shoes and the brake drum, some operators prefer to leave off the dust shield in order that additional air may circulate within the brake drums for the necessary cooling effect. In the case of the present brake construction, due to the fact that the dust shield is carried by spiders and in itself is not directly secured to the wheel support or has any of the brake components supported therefrom, it will be readily apparent that the dust shield may be dispensed with, as desired.

Although from a standpoint of convenience of manufacture and replacement it is desirable that the various spiders of the brake construction be formed of individual components, it is to be understood that this is not necessary for the present brake construction. If desired, the spiders may be incorporated into multiple units, and it is possible to provide a single casting which will incorporate all of the various spiders. Also, at this time, it is pointed out that while the present invention incorporates spiders which are specifically designed to have the added function of supporting the dust shield, it may be desirable in some instances to provide separate mounting brackets for the dust shield.

Further considering the spiders, it is pointed out that while the term "spider" has been used, the articles so referred to may also be considered as bosses or brackets, or could even be integral parts of the wheel supports in certain constructions.

It is also pointed out that the push rods interconnecting the bellcranks and the brake shoes, while the present construction permits ease of assembly and disassembly, may be in the form of push rod type connectors which have their ends pivotally connected to the bellcrank and the brake shoe, with the ends, if desired, being connected to these components by means of pivot pins.

From the foregoing, it will be apparent that there has been provided suitable structure for accomplishing the desired end. Although only a preferred embodiment of the brake construction has been illustrated and described, it is to be understood that minor variations may be made in the structural details thereof within the spirit and scope of this invention, as defined in the appended claims.

I claim:

1. In a vehicle brake, a plurality of substantially coplanar brake shoes, a brake drum circumposed about said brake shoes, bracket means adapted to be carried by a vehicle wheel carrier, said bracket means including first means independently pivotally mounting each of said brake shoes in said brake drum, a plurality of remotely controlled brake shoe actuators for independently operating each of said brake shoes, said bracket means including second means mounting each brake shoe actuator remote from said brake shoes and out of the general plane thereof and exteriorly of said brake drum, a bellcrank for each brake shoe, said bracket means including third means pivotally mounting each of said bellcranks for swinging movement within the general plane of said brake shoes and in a plane normal thereto, each of said brake shoe actuators having a linearly movable link extending out of said brake drum and pivotally connected to a respective one of said bellcranks, and a freely supported push rod in the general plane of said shoes and extending between each bellcrank and a respective one of said brake shoes and abuttingly engaging the same.

2. The vehicle brake of claim 1 wherein a fixed dust shield is disposed intermediate said brake shoe actuators and said bellcranks with said links passing therethrough.

3. The vehicle brake of claim 2 wherein said dust shield is secured to said second means.

4. The vehicle brake of claim 1 wherein return spring means are disposed between adjacent ends of said brake shoes.

5. In a vehicle brake, a plurality of circumferentially arranged generally coplanar brake shoes, a shoe spider in the general plane of said shoes for pivotally mounting each of said brake shoes for independent movement, said shoe spiders having means for mounting the same on a wheel support in circumferentially arranged relation, a bellcrank for each brake shoe, a bellcrank spider for each of said bellcranks, means on said bellcrank spiders for mounting the same on a wheel support in circumferentially arranged relation and spaced axially from said shoe spiders, each of said bellcrank spiders carrying a pivot pin mounting an associated one of said bellcranks for pivotal movement in a plane disposed generally normal to the plane of said brake shoes, a push rod extending and generally movable in the general plane of said shoes between and abuttingly engaging one of said bellcranks and an associated one of said brake shoes, and a plurality of actuator means spaced axially from the plane of said brake shoes and independently connected to said bellcranks for independently actuating the same.

6. The vehicle brake of claim 5 wherein said spider mounting means each includes means adapted to be welded to a wheel support.

7. The vehicle brake of claim 5 wherein a dust shield is secured to said bellcrank spiders.

8. In a vehicle brake, a plurality of circumferentially arranged brake shoes, a shoe spider for pivotally mounting each of said brake shoes, said shoe spiders having means for mounting the same on a wheel support in circumferentially arranged relation, a bellcrank for each brake shoe, a bellcrank spider for each of said bellcranks, means on said bellcrank spiders for mounting the same on a wheel support in circumferentially arranged relation and spaced axially from said shoe spiders, each of said bellcrank spiders carrying a pivot pin mounting an associated one of said bellcranks for independent pivotal movement in a plane disposed generally normal to the plane of said brake shoes, a plurality of push rods extending between and engageable with a respective one of said bellcranks and an associated one of said brake shoes, and an independently operated actuator for each of said respective bellcranks spaced outside of the plane of said brake shoes and connected to a respective one of said brake shoes.

9. The vehicle brake of claim 8 wherein there is a mounting bracket for each of said actuators.

10. The vehicle brake of claim 8 wherein each of said actuators has a linearly movable link pivotally connected to a respective one of said bellcranks.

11. The vehicle brake of claim 8 wherein said spider mounting means each includes means adapted to be welded to a wheel support.

12. The vehicle brake of claim 8 wherein a dust shield is secured to said bellcrank spiders.

13. The vehicle brake of claim 8 wherein each of said actuators has a linearly movable link pivotally connected to a respective one of said bellcranks, a dust shield is secured to said bellcrank spiders intermediate said actuators and said bellcranks, and said links passing through said dust shield.

14. In a vehicle brake, a vehicle wheel carrier, a brake drum rotatably mounted on said carrier [a plurality of substantially coplanar] *at least one* brake (shoes) *shoe* disposed within said brake drum, first bracket means in said drum and mounted on said wheel carrier, said bracket means including means pivotally mounting said brake [shoes] *shoe* in said drum for [independent] pivotal movement, a [plurality of independently operated] brake shoe [actuators each] actuator operatively connected to [a respective] *said* brake shoe, second bracket means exteriorly of said brake drum and mounted on said wheel carrier, said brake shoe [actuators] *actuator* being mounted on said second bracket means, a [plurality of bellcranks] *bellcrank* pivotally mounted on said wheel carrier within said drum, said [bellcranks] *bellcrank* being pivotal on an axis normal to the axis of pivotal movement of said [shoes] *shoe* and within the general plane of said [shoes] *shoe, a* push [rods] *rod* [operatively] *freely supported and* engaged between one end of the brake [shoes] *shoe* and said [bellcranks] *bellcrank remote from the pivotal axis thereof* and within the general plane of said [shoes] *shoe* and *a* linear [links] *link* engaged between said [actuators] *actuator*, projecting into said [drums] *drum* engaged with another end of said [bellcranks] *bellcrank remote from the pivotal axis thereof*, said drum opening toward said [plural actuators] *actuator*.

References Cited by the Examiner

The following references, cited by the Examiner, are of record in the patented file of this patent or the original patent.

UNITED STATES PATENTS

| | | | |
|---|---|---|---|
| 2,140,753 | 12/38 | La Brie | 188—78 |
| 2,331,652 | 10/43 | Buckendale | 188—205 |
| 2,417,192 | 3/47 | Goepfrich | 188—78 |
| 2,422,462 | 6/47 | Ash | 188—18 |
| 2,770,325 | 11/56 | Dombeck | 188—18 |
| 3,023,853 | 3/62 | Nawrot | 188—106 |

FOREIGN PATENTS

| | | |
|---|---|---|
| 522,756 | 3/62 | Great Britain. |

MILTON BUCHLER, *Primary Examiner.*

FERGUS S. MIDDLETON, *Examiner.*